United States Patent [19]
DeWolff et al.

[11] Patent Number: 5,726,736
[45] Date of Patent: Mar. 10, 1998

[54] METHODS OF LABELING PHOTOGRAPHS

[75] Inventors: Curtis Edward DeWolff; Brian Keith Gallipeau, both of Fairport; Thomas Eldred Lambdin, Lyons, all of N.Y.

[73] Assignee: Eastman Kodak Company, Rochester, N.Y.

[21] Appl. No.: 638,404

[22] Filed: Apr. 26, 1996

Related U.S. Application Data

[63] Continuation of Ser. No. 473,177, Jun. 7, 1995, abandoned.
[51] Int. Cl.⁶ .............................. G03B 27/32; G03B 27/52
[52] U.S. Cl. .................................. 355/39; 355/40; 355/77
[58] Field of Search .................................. 355/39, 40, 70, 355/77

[56] References Cited

U.S. PATENT DOCUMENTS

| | | |
|---|---|---|
| 3,947,109 | 3/1976 | Kinder et al. . |
| 4,039,258 | 8/1977 | Hujer et al. ................................ 355/27 |
| 4,574,692 | 3/1986 | Wahli . |
| 4,720,733 | 1/1988 | Ohtake et al. . |
| 4,758,215 | 7/1988 | Kogane . |
| 4,800,406 | 1/1989 | Signoretto . |
| 4,823,162 | 4/1989 | Renn et al. . |
| 4,896,186 | 1/1990 | Tokuda ........................................ 355/40 |
| 4,933,711 | 6/1990 | Gudmundson et al. . |
| 4,963,919 | 10/1990 | Matsumoto et al. . |
| 5,281,993 | 1/1994 | Crochetierre et al. ...................... 355/40 |
| 5,294,950 | 3/1994 | DuVall et al. ............................. 354/109 |
| 5,337,119 | 8/1994 | Tanibata ..................................... 355/40 |

*Primary Examiner*—Fred L. Braun
*Attorney, Agent, or Firm*—Christopher J. Fildes; Frank Pincelli

[57] ABSTRACT

A method of labeling photographic paper during photofinishing processing includes making a print having a print image portion and an adjacent label image portion, placing a code on the photographic paper to denote placement of a line of perforation to separate the print image portion and label image portion, exposing the label image portion with labeling information, generating an image on the label image portion, detecting the code for placing the line of perforation on the photographic paper, and forming the line of perforation at the detected location to separate the print image portion and the label image portion.

10 Claims, 3 Drawing Sheets

METHODS OF LABELING PHOTOGRAPHS

This is a continuation of application Ser. No. 08/473,177, filed Jun. 7, 1995, now abandoned.

FIELD OF THE INVENTION

This invention relates to labeling photographs and more particularly to a method of providing a photographic print having a detachable printed label portion.

BACKGROUND OF THE INVENTION

It is known in the art relating to photographic labeling to use various methods to label photographic print with text and graphics. Prints have been labeled on either front or back, or both front and back.

Current methods employed for front printing include exposing the photosensitive emulsion to light; applying a donor (ink) directly to the emulsion; or affixing a pre-printed label onto the front of the print. Methods employed in back printing include applying a donor directly to the back of print; sensitizing a specially-treated area of the paper; or affixing a pre-printed label to the back of the print.

Conventional print labels are generated either during or after photofinishing. A separate mechanical device is required to apply a labeling donor to the print and may yield varying results on varying photographic papers. Moreover, many labeling technologies produce inconsistent results on identical photographic papers. Papers may not be uniformly manufactured, and labelers may operate inconsistently or degrade as donor nears depletion. Applying pre-printed labels requires steps to print and mechanically affix the labels and label adhesion has been found to diminish as time passes.

SUMMARY OF THE INVENTION

The present invention provides a method of labeling a photographic print on the emulsion side of the photographic print during photofinishing printing. In accordance with the invention, a print is provided with a print image portion and an integral label image portion. The label image portion is separated from the print image portion by a line of perforation. The label portion can be folded over to be reviewed from the back side of the print or can be separated from the print image portion for mounting or other disposal. Pertinent labeling information is exposed on the label image portion and an image is generated on the label image portion.

The invention provides high quality, full color capable labeling. The label image portion can be located on any side of a print, left or right, top or bottom. Multiple adjacent labels can be printed and perforated, and a single print can have multiple labels if so desired.

Accordingly, the invention provides a label that does not show through or overlay the print it identifies. Furthermore, the label is attached without any adhesive and it can be folded over along the line of perforation for concealment or removed altogether without affecting the print image portion of the print.

These and other features and advantages of the invention will be more fully understood from the following detailed description of the invention taken together with the accompanying drawings.

DETAILED DESCRIPTION OF THE INVENTION

Figure 1:
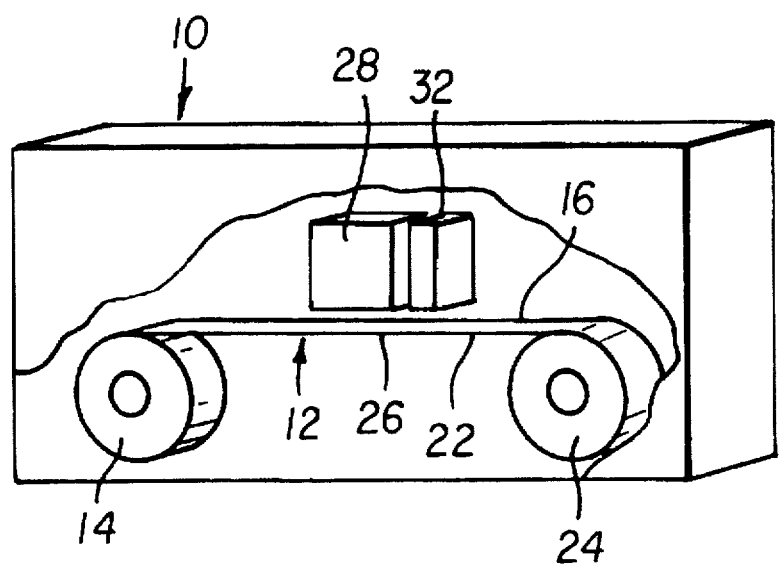
FIG. 1 is a perspective view of a photofinishing printer including a system for forming perforated imaged labels in accordance with the invention.

Referring now to the drawings in detail, FIGS. 1–5 illustrate one method according to the present invention wherein a well known roll based photofinishing printer 10 includes a system for creating a perforated photographic label. In such a printer 10, a roll of photographic paper 12 is mounted on a photographic paper feed 14. The photographic paper 12 includes a front or emulsion side 16, on which a print image and a label image is generated and a back side 22.

The paper 12 is fed onto a photographic paper take-up 24. Intermediate the paper feed 14 and paper take-up 24, a photographic paper web 26 passes an exposure subsystem 28, as is known, for exposing the emulsion side 16 to generate a print image on a print image portion 30 of the paper 12.

In addition, the paper web 26 passes a perforated photographic label imager 32. The imager 32 exposes a predefined label image portion 36 of the photographic paper 12 adjacent to the print image portion 30. The predefined label portion 36 can be on any side; top, bottom, left or right, of the print image portion 30 it identifies or labels.

The labeling information provided on the label image portion 36 can be a positive image, either black/white or color. In addition, the labeling information can be bar coded or printed in other machine readable formats on the paper 12. The information can be sized to any size.

The label imager 32 relies upon the location of a line of perforation 38 in the photographic paper 12 to locate the label content properly. Photographic label perforators are known which operate on both stationary and moving photographic papers. The photographic paper 12 can be perforated at any time including paper manufacture, paper loading, paper printing, paper take-up, or paper finishing.

In the arrangement of FIG. 1, the photographic paper 12 has been pre-perforated prior to printing to produce prints with perforated imaged labels as illustrated in FIGS. 2–5. Alternatively, the paper 12 could have been perforated after the printing of the print image and the label image as hereinafter described. As becomes apparent, label imaging can be performed preceding, during, or after paper perforation but always relies upon the final actual or projected position of the line of perforation 38. The desired position of the line of perforation 38 can be either pre-configured or denoted variably through the use of known hole-punch mechanisms.

Preferably, in the roll-based photographic printer 10 of FIG. 1, the label image portion 36 is generated along a side of the print image portion 30 so as not to reduce the dimensions of the standard photographic print, yet still attach to the print. Alternatively, the label portion 36 can be generated along the top or bottom of the print image portion 30 with an associated reduction in size of resultant photographs on standard photographic paper.

Figure 6:
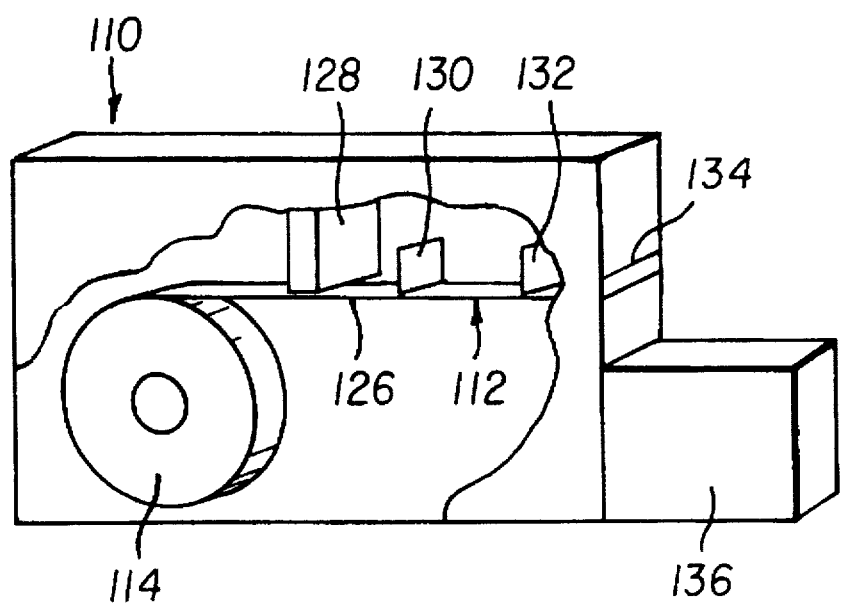
FIG. 6 is a perspective view of a photofinishing finisher/cutter including a system for forming perforated imaged labels on processed printed paper in accordance with the invention.
Figure 2:
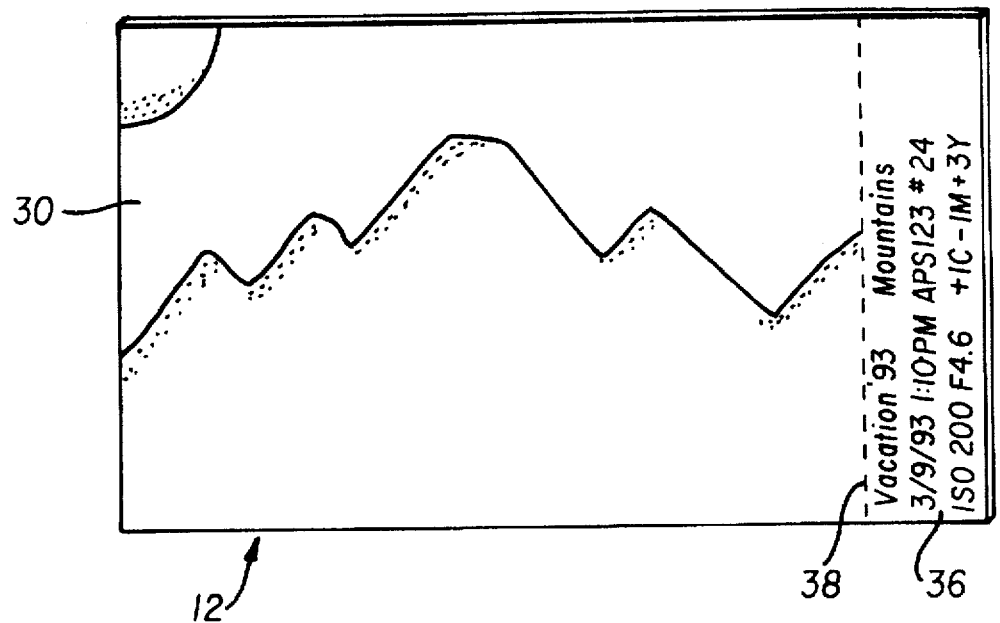
FIG. 2 is a perspective view of an exposed photographic paper including a print image portion and an integral label image portion on the right of the print image portion.
Figure 3:
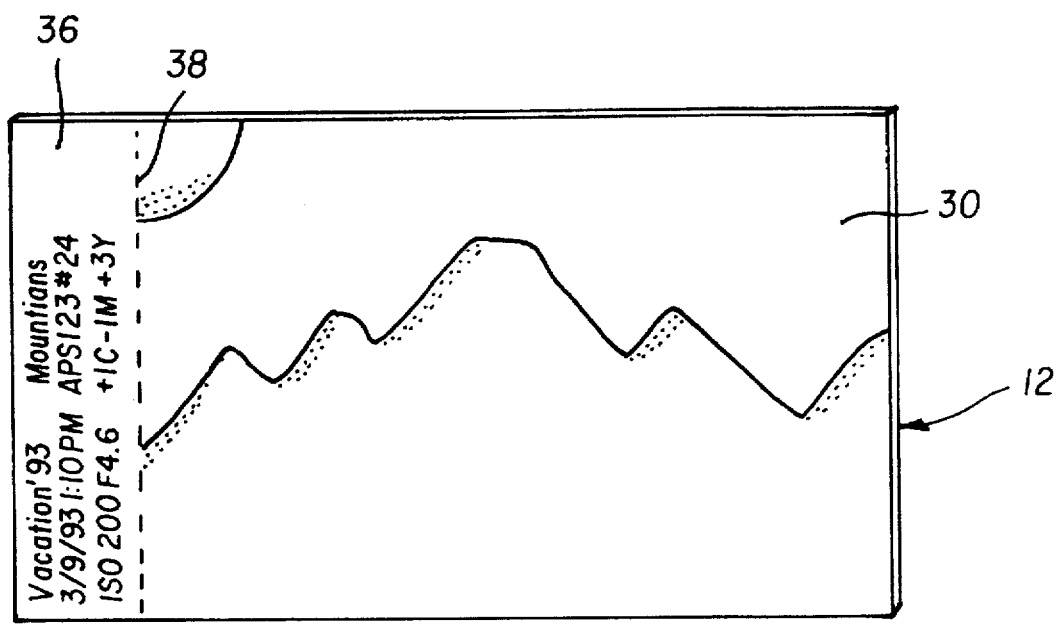
FIG. 3 is a perspective view of an exposed photographic paper including a print image portion and an integral label image portion on the left of the print image portion.
Figure 4:
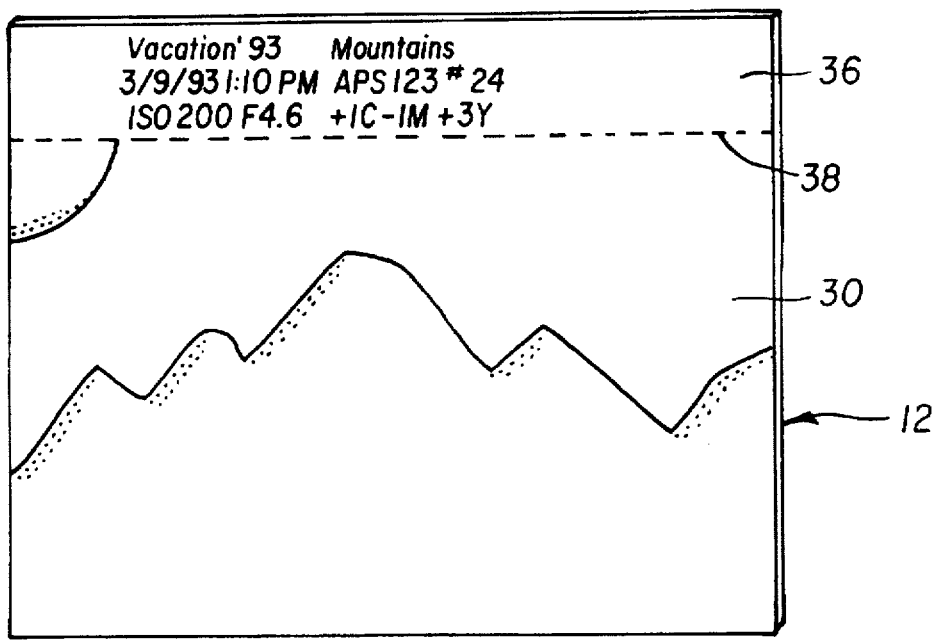
FIG. 4 is a perspective view of an exposed photographic paper including a print image portion and an integral label image portion on the top of the print image portion.
Figure 5:
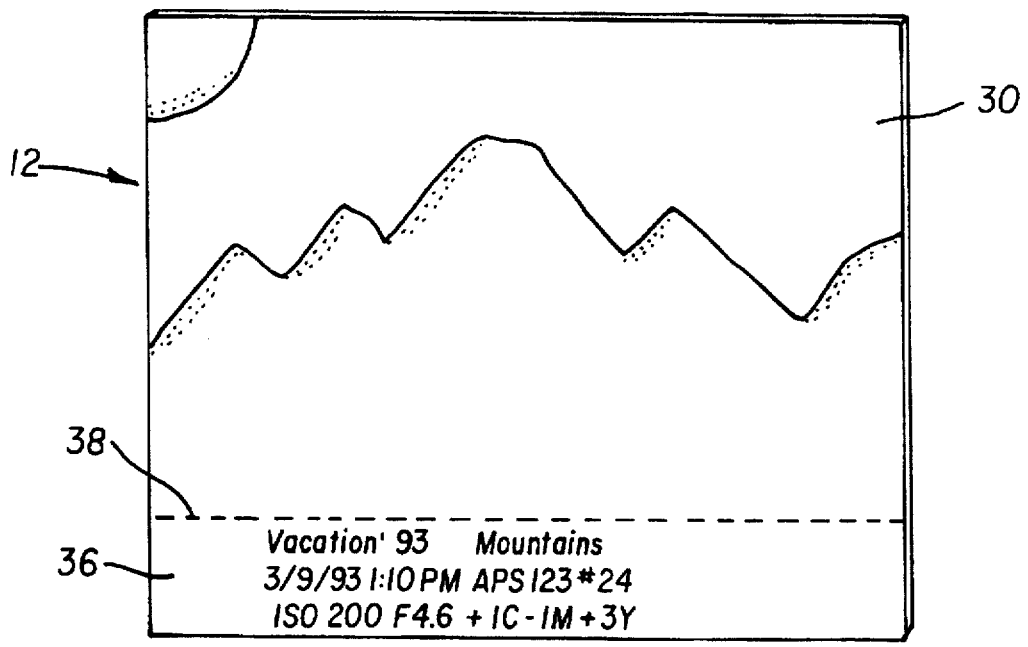
FIG. 5 is a perspective view of an exposed photographic paper including a print image portion and an integral label image portion on the bottom of the print image portion.

FIG. 6 illustrates a well known print cutter/finisher 110 including a system for creating a perforated photographic label from a roll of paper 12 processed and printed in accordance with the hereinabove described method wherein non-perforated paper has been used in the photofinishing printer 10. Cutter/finisher 110 includes a paper feed 114 on which a roll of processed printed paper 112 is mounted. A web 126 of processed printed paper 112 is unrolled from paper feed 114, perforated, and cut into prints as hereinbelow described.

A perforation placement detector 128 is used to locate the line along which the processed printed paper 112 is to be perforated. The detector 128 can be a processor that utilizes codes, such as those used for cutting processed printed paper, to provide instructions for perforating the paper. Alternatively, the detector 128 can be a scanner that reads scanner codes printed on the label image portion 36 or a label slug, a thin strip of photographic paper discarded by some manufacturer's cutter/finisher. These scanner codes are deciphered by the detector 128 to denote the position(s) of the line of perforation 38. The scanner codes are most commonly placed on the photographic paper 12 during label imaging, although the invention allows printing of scanner codes at any time and in any manner prior to perforation.

The scanner 128 can supplement mechanical punch codes for print perforation. In a system without any scanner 128 or mechanical codes, perforations can be placed at fixed distances from print cuts based on a perforation placement algorithm.

A photographic label perforator 130 in communication with the perforation placement detector 128 perforates the processed photographic paper 112 according to input signals received from the detector. Known photographic paper perforators include the rotational and bar types.

The perforated web 126 of processed printed paper 112 passes a cutting blade 132 of conventional design that cuts the paper 112. A cut print results having a print image portion 30 or print together with a label image portion 36 or label integral, or attached to the print and separated by line of perforation 38. The print exits the cutter/finisher 110 through a cut print exit 134 and is received in a cut print collection bin 136.

After photofinishing printing, developing, and cutting, the label 36 remains attached to the print 30. Subsequently, the label 36 can be left undisturbed and attached to the print 30, left attached to the print and folded behind the print, or torn away from the print along the line of perforation. The separated label 36 can be otherwise attached to either the front 16 or back 22 of the print.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

| Parts List | |
|---|---|
| 10. photofinishing printer | 110. cutter/finisher |
| 12. photographic paper | 112. processed printed paper |
| 14. paper feed | |
| 16. emulsion side | 114. paper feed |
| 22. back side | 126. web |
| 24. paper take-up | 128. detector |
| 26. paper web | 130. label perforator |
| 28. exposure subsystem | 132. cutting blade |
| 30. print image portion | 134. print exit |
| 32. label imager | 136. collection bin |
| 36. label image portion | |
| 38. line of perforation | |

What is claimed is:

1. A method of photofinishing processing characterized by:

making a sequential series of labeled photographic prints from a continuous web of photographic paper, each print having a print image portion and an adjacent label image portion;

generating a label image on each said label image portion by exposing labeling information thereon;

generating a print image on each said print image portion by exposing an image thereon;

forming a line of perforation between each said print image portion and the adjacent label image portion; and separating said labeled prints by cutting the web between the prints;

whereby a sequential series of cut edged prints is formed, each with a label attached along said line of perforation and capable of being read from the image side of the print, or being folded back along the line of perforation to be read from the non-image side of the print, or being detached for use or mounting in any other desired manner.

2. The method of claim 1 and further characterized by:

detecting a location of placement of the line of perforation on said photographic paper; and forming said line of perforation at the detected location.

3. The method of claim 2 wherein detecting a location of placement of the line of perforation is characterized by:

detecting punch codes for print perforation; and forming said line of perforation at the detected location.

4. The method of claim 2 wherein detecting a location of placement of the line of perforation is characterized by:

detecting a location at a fixed distance from a print cut; and forming said line of perforation at the detected location.

5. The method of claim 1 characterized by:

placing a code on the photographic paper during label imaging to denote the location of perforated line placement; and forming said line of perforation at the denoted location.

6. The method of claim 5 characterized by:

detecting a location denoted by said code for placing said line of perforation on the photographic paper; and forming said line of perforation at the detected location.

7. The method of claim 1 wherein generating a label image is characterized by:

imaging text on said label portion.

8. The method of claim 1 wherein generating a label image includes:

imaging a bar code on said label portion.

9. The method of claim 1 wherein generating a label image is characterized by:

imaging a machine readable format on said label portion.

10. A method of photofinishing processing characterized by:

making a sequential series of labeled photographic prints from a continuous web of photographic paper, each print having a print image portion and an adjacent label image portion;

placing a code on the photographic paper to denote placement of a line of perforation to separate each said print image portion and its respective label image portion;

generating a label image on each said label image portion by exposing labeling information thereon;

generating a print image on each said print image portion by exposing an image thereon;

detecting a location denoted by said code for placing each said line of perforation on the photographic paper;

forming said line of perforation at each detected location to separate each said print image portion and label image portion; and separating said labeled prints by cutting the web between the prints;

whereby a sequential series of cut edged prints is formed, each with a label attached along said line of perforation and capable of being read from the image side of the print, or being folded back along the line of perforation to be read from the non-image side of the print, or being detached for use or mounting in any other desired manner.

* * * * *